Oct. 30, 1945. D. ADAMS 2,387,867
TAPE MEASURING AND MARKING MACHINE
Filed March 9, 1943 8 Sheets-Sheet 2
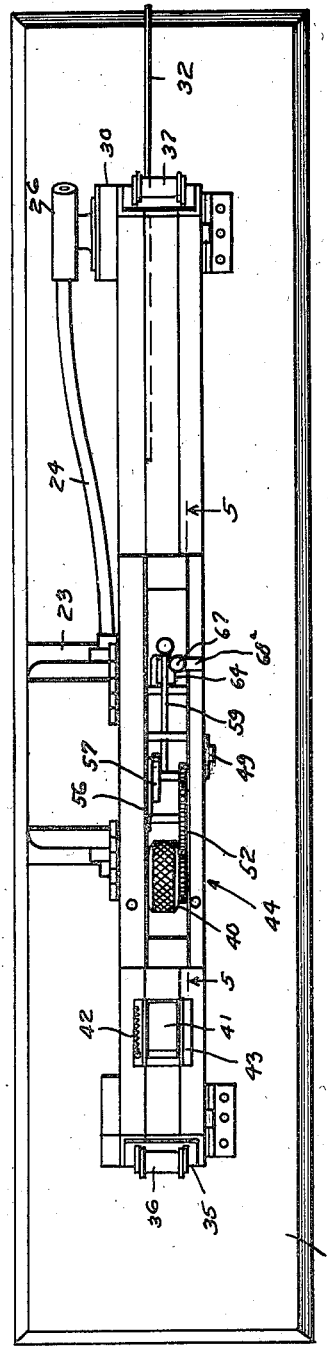
Inventor
Dock Adams
By Clarence A. O'Brien
and Harvey B. Jacobson
Attorneys

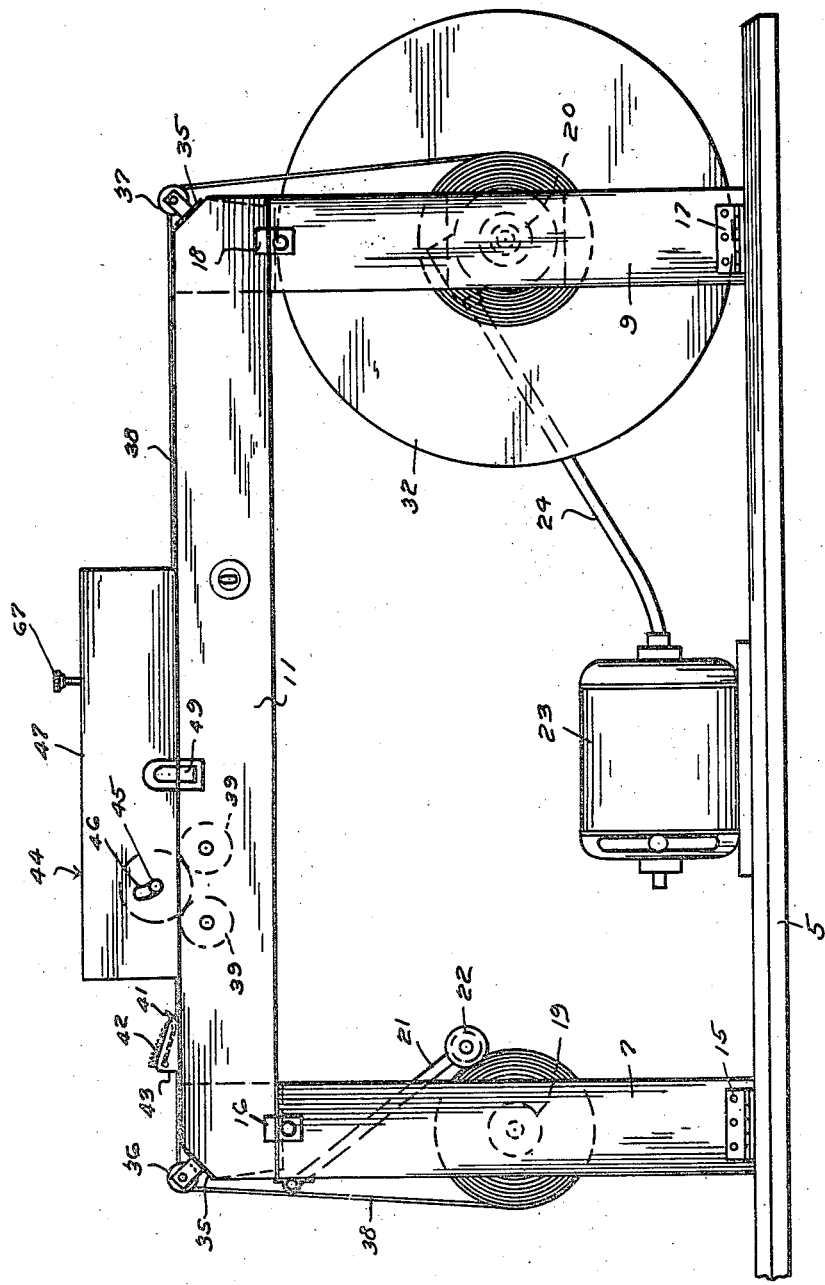

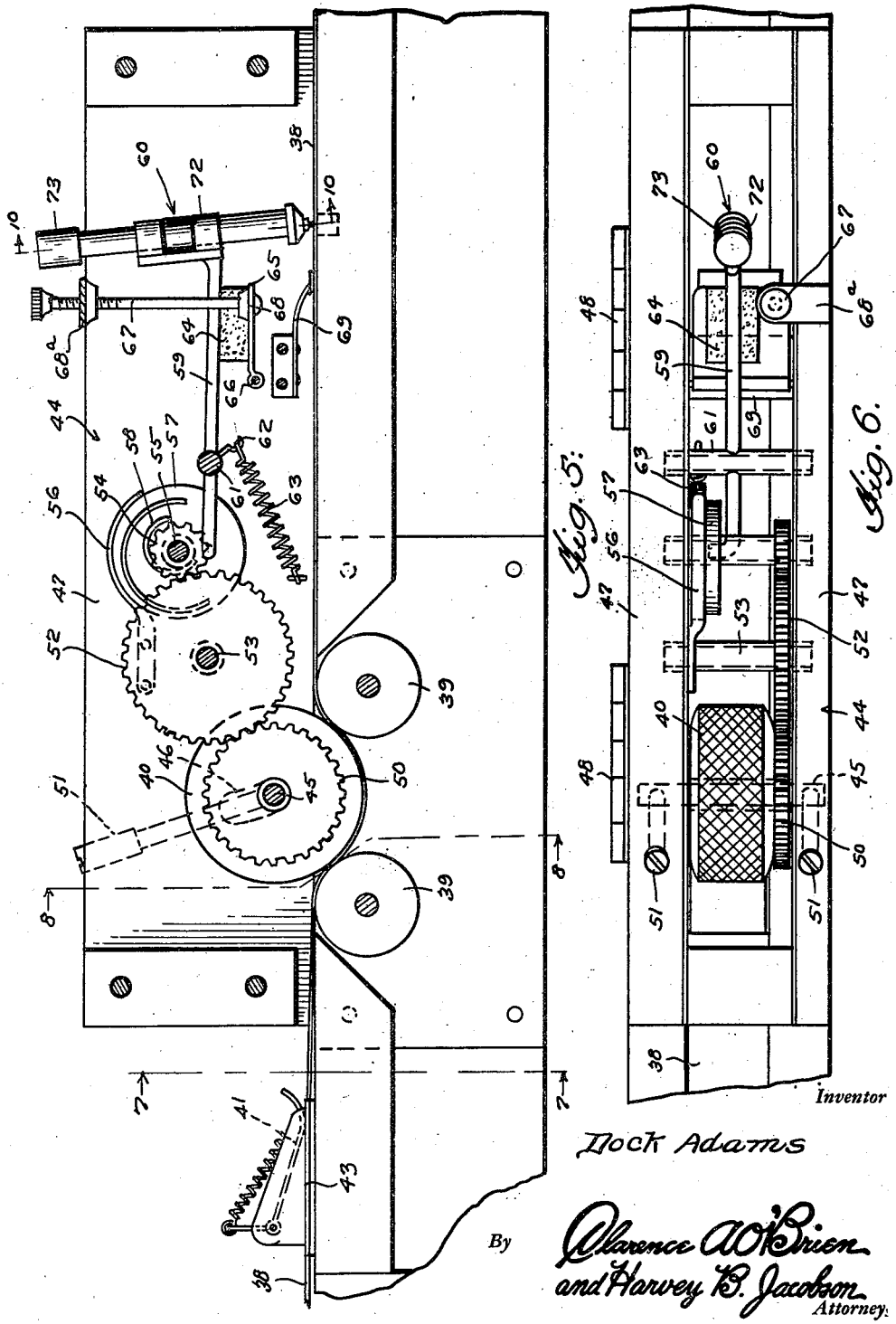

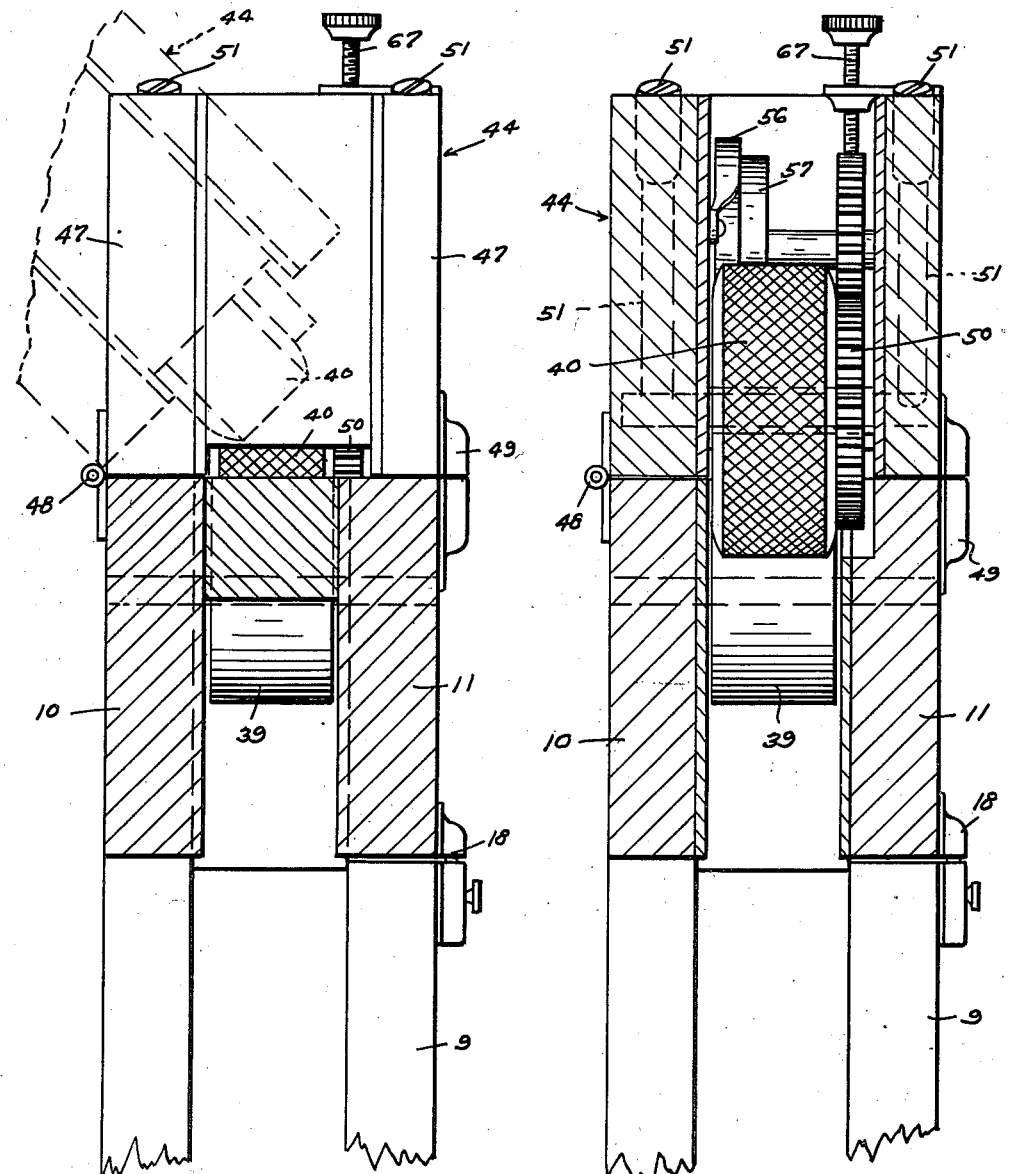

Oct. 30, 1945. D. ADAMS 2,387,867
TAPE MEASURING AND MARKING MACHINE
Filed March 9, 1943 8 Sheets-Sheet 5

Inventor
Dock Adams

By Clarence A. O'Brien
and Harvey B. Jacobson
Attorney

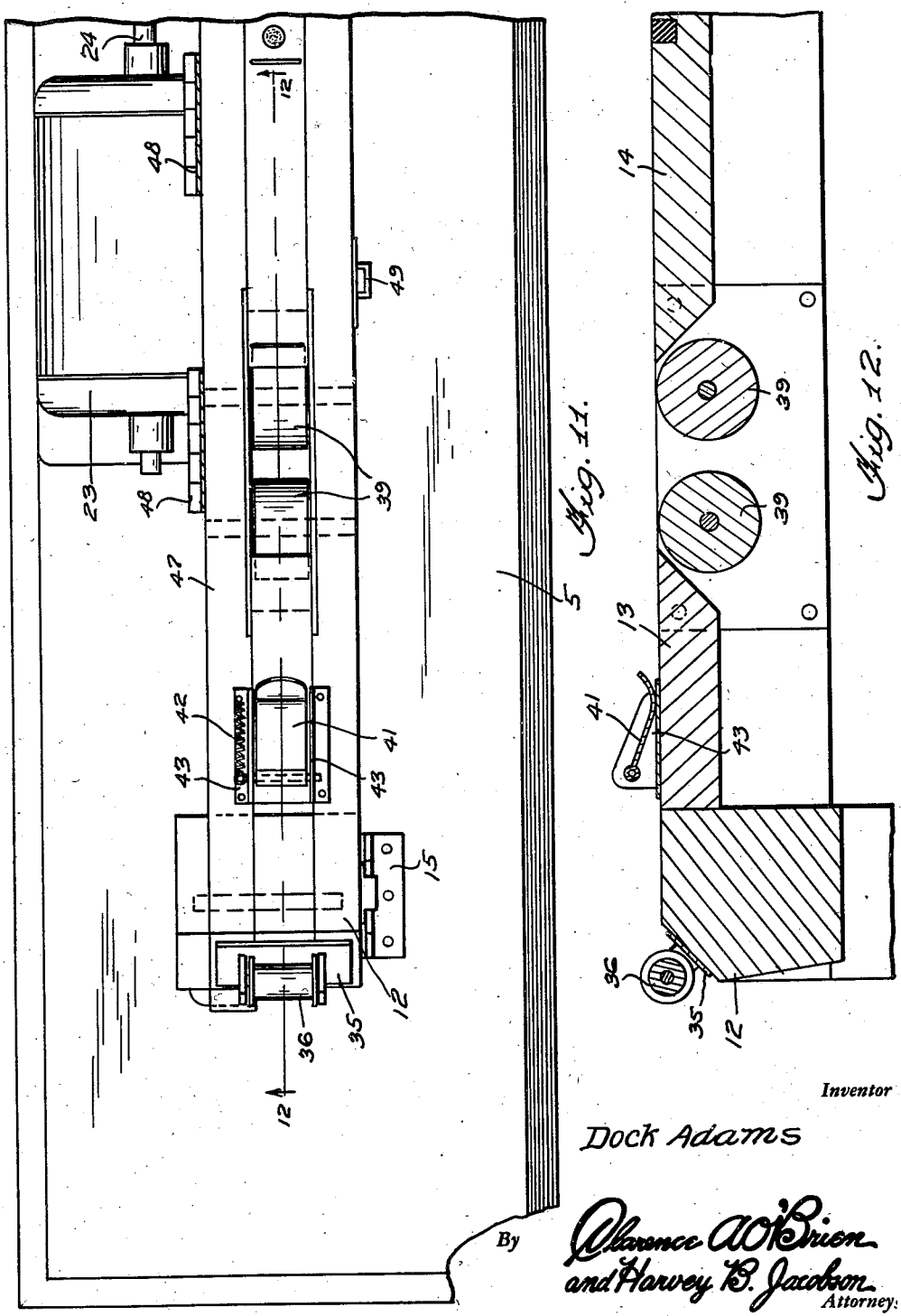

Oct. 30, 1945.  D. ADAMS  2,387,867
TAPE MEASURING AND MARKING MACHINE
Filed March 9, 1943  8 Sheets-Sheet 7
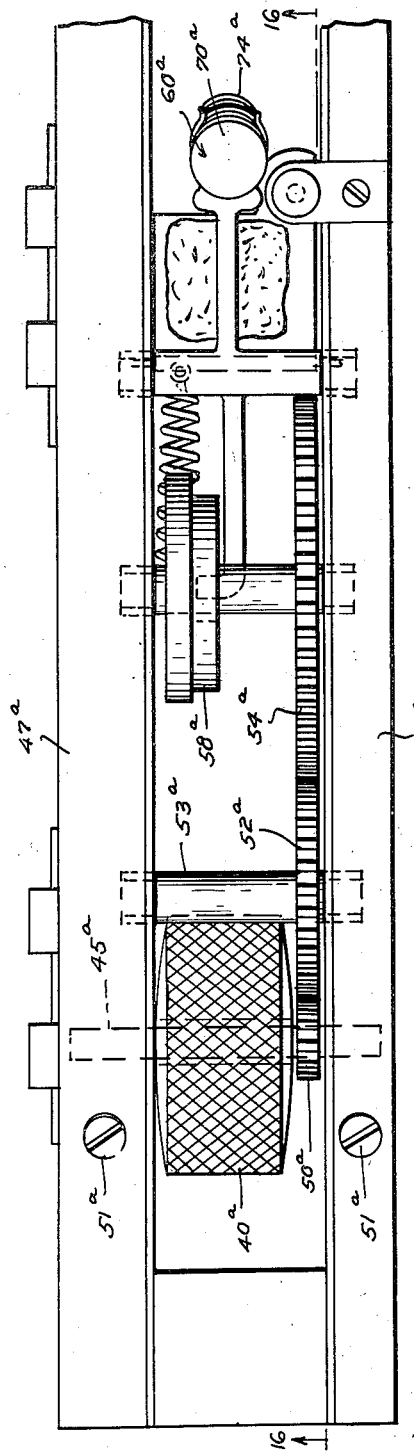
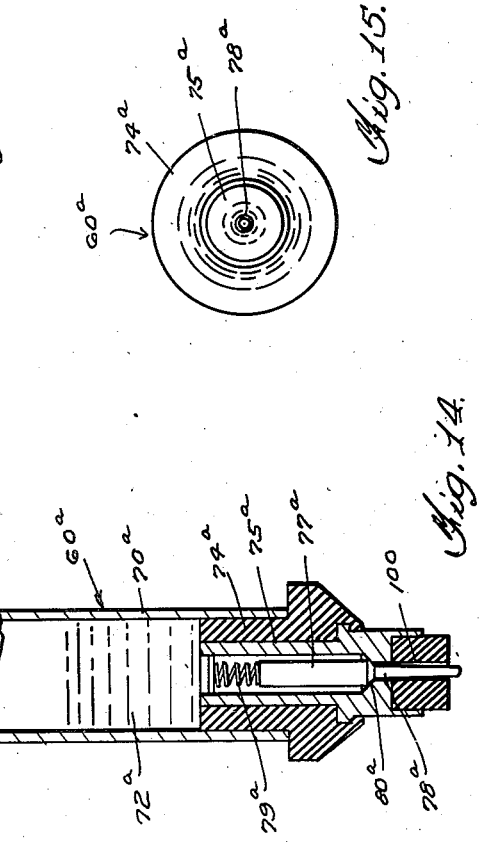
Inventor
Dock Adams
By Clarence A. O'Brien
and Harvey B. Jacobson
Attorneys Patented Oct. 30, 1945

2,387,867

UNITED STATES PATENT OFFICE 2,387,867

TAPE MEASURING AND MARKING MACHINE

Dock Adams, Whitesburg, Ky.

Application March 9, 1943, Serial No. 478,563

3 Claims. (Cl. 33—129)

This invention relates to new and useful improvements in means for measuring and marking elongated work and more particularly to a machine for measuring and marking tape.

The principal object of the present invention is to provide a machine in which a roll of unmeasured tape can be placed and automatically measured in predetermined lengths, marked at said lengths and rewound.

Another important object of the invention is to provide a machine of the character stated wherein the parts are readily accessible for the purpose of placing or unplacing rolls of tape and further to reach various parts for the purpose of repairs or replacement.

Other important objects of the invention will become apparent to the reader of the following description.

In the drawings:

Figure 1 represents a side elevational view of the machine.

Figure 2 is a top plan view.

Figure 3 is a sectional view taken substantially on the line 3—3 of Figure 1.

Figure 4 is a sectional view taken substantially on the line 4—4 of Figure 2.

Figure 5 is an enlarged fragmentary detailed sectional view taken substantially on the line 5—5 of Figure 2.

Figure 6 is a fragmentary top plan view of the structure shown in Figure 1.

Figure 7 is a sectional view taken substantially on the line 7—7 of Figure 5.

Figure 8 is a sectional view taken substantially on the line 8—8 of Figure 5.

Figure 11 is a fragmentary horizontal sectional view taken substantially on the line 11—11 of Figure 9.

Figure 12 is a fragmentary vertical sectional view taken substantially on the line 12—12 of Figure 11.

Figure 13 is a fragmentary top plan view showing a modified form of stamping and measuring device.

Figure 14 is a fragmentary vertical sectional view through a modified form of marker.

Figure 15 is an end elevational view of the marker looking at the lower end thereof.

Figures 9, 10:
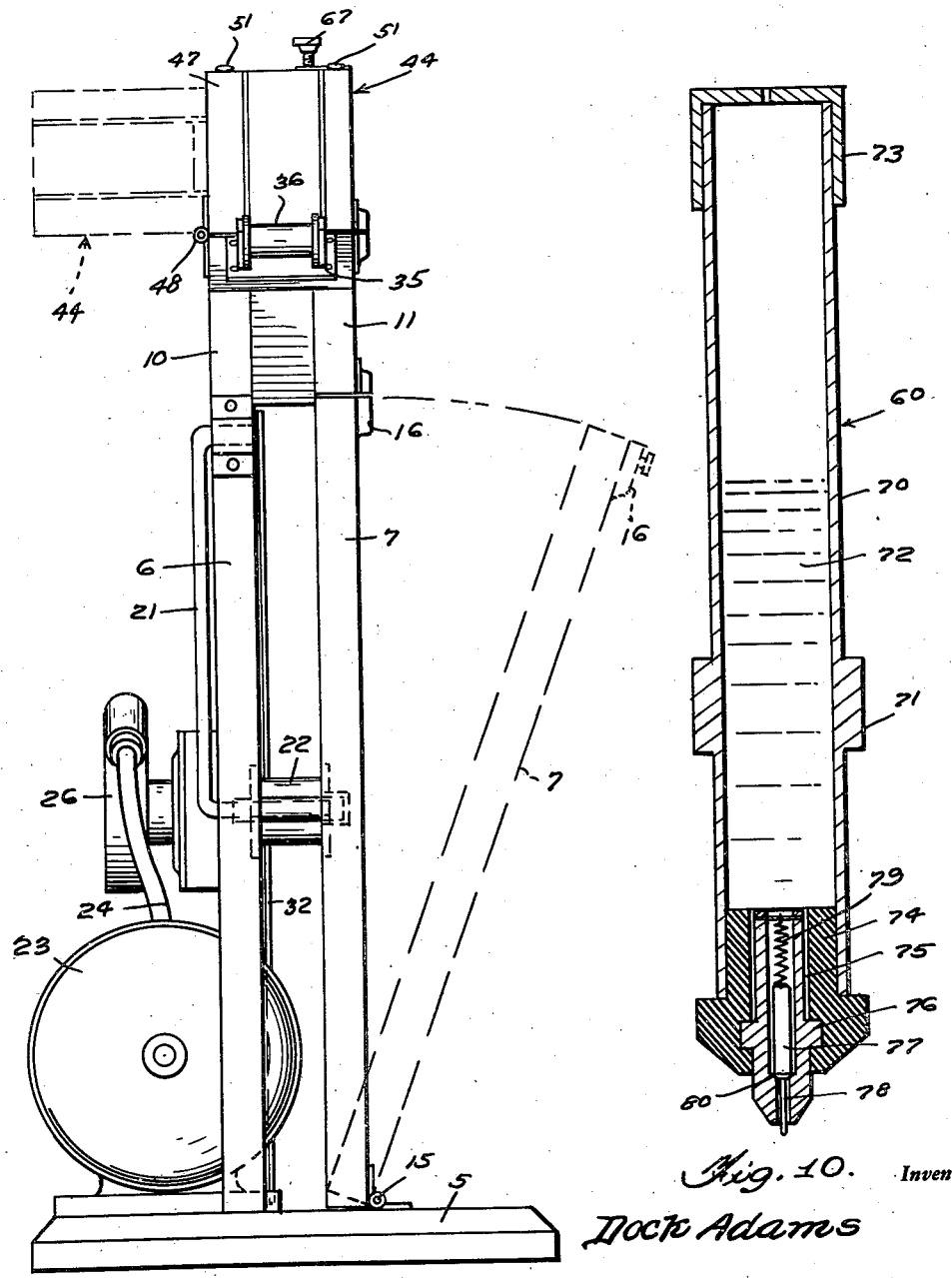
Figure 9 is an end elevational view of the machine looking at the end to the left in Figure 1.
Figure 10 is a vertical sectional view through the fountain marker.

Referring to the drawings wherein like numerals designate like parts, it can be seen that numeral 5 denotes a base upon which is mounted a frame, this frame consisting of a pair of leg members 6, 7 rising from one end of the base and a second pair of legs 8, 9 rising from the opposite end of the base. A pair of horizontal beams 10, 11 having filler blocks 12 interposed between the end portions thereof and suitably secured together in conjunction with filler strips 13, 14 complete the frame in general.

The leg 7 is hinged at its lower end as at 15 to the base 5 and a suitable latch 16 is provided between its upper end and the beam 11. The leg 9 is likewise hinged as at 17 and provided with a latch as at 18. These hinged legs allow for the placement of an unmeasured roll 19 of tape between the legs 6, 7 and the removal of a roll 20 of measured and marked tape from between the legs 8 and 9.

Supported by the leg 6 as shown in Figure 9, is a swingable arm 21 provided with a roller 22 for the purpose of affording some pressure against the tape on the roll 19 in order that the tape shall not loosen.

Mounted upon the base 5 is an electric motor 23 which has a flexible shaft drive line 24 to a worm 25 located in one side of a housing 26, in which is located a gear 27 with which the worm 25 meshes.

The gear 27 is keyed to a shaft 28 which is disposed through a bearing 29 located in the leg 8 and a block 30 attached thereto. The shaft 28 has a threaded portion 31 on to which is threadedly disposed the hub portion of a substantially large banking disk 32. A reduced pintle 33 projects from the threaded portion 31 and is preferably provided with a spline rib over which the spool 20 (see Figure 1) can be disposed. As shown in Figure 3, the leg 9 preferably has a recess or socket 34 for the purpose of receiving the free end of a spindle 33, it of course being understood that the leg 9 is hinged so that it can be swung away from the spindle 33 to permit removal of the spool 20 with its meshed and marked tape thereon.

Mounted on plates 35 secured to beveled end portions of the beams 10, 11 are guide rollers 36, 37 over which tape 38 from the roll 19 is trained.

As shown in Figure 12, the filler strips 13, 14 are cut away to define a vertical opening in which are mounted a pair of rolls 39, 39. These rolls 39, 39 are spaced apart in order that a pressure roll 40 may partly interlap the same as shown in Figure 5.

As shown in Figure 12, a pressure exerting finger 41 is mounted on the filler strip 13 at a point between the guide roller 36 and the roll 39, this finger 41 being provided with a spring 42 for forcing the same downwardly against the plate 43 or against a tape 38 when a tape is disposed between the plate 43 and the finger 41.

The invention further embodies a stamping and measuring device generally referred to by numeral 44 (see Figure 5). This device includes a shaft 45 having its end portions disposed through arcuate slots 46 in the side walls 47, 47 of a hinged frame, this frame being hingedly secured as at 48 to the beam 10 (see Figure 7). Suitable latch means 49 is provided between the frame and the beam 11.

On the shaft 45 is the pressure roll 40 and also a gear 50. Threaded members 51, 51 are disposed downwardly through the side walls 47, 47 with their lower ends bearing against the end portions of the shaft 45 in order to hold the roll 40 in proper relation with respect to the rolls 39, 39.

The gear 50 meshes with a gear 52 on a shaft 53 and this gear 52, in turn, meshes with the pinion 54 located on a shaft 55, these shafts all being supported by the side walls 47. A tensioning spring 56 is provided on one side wall 47 for riding a disk 57 on the shaft 55 in order to prevent any free action of the gears.

On the disk 57 is a cam 58 against which the adjacent end of a rocker 59 rides, this cam having an interruption therein in order that the rocker 59 from time to time is free in order to release a marking device generally referred to by numeral 60.

The rocker 59 is carried by a shaft 61 interposed between the side walls 47 and this shaft 61 has a lug 62 from which extends a tension spring 63, normally tending to hold the rocker 59 down against a cushion block 64 supported on a pan 65 swingably supported as at 66. This pan has a rod 67 swivelly connected at its lower end thereto, as at 68 and the upper end of this rod is threadedly disposed through a bridge member 68. Adjustment of the rod 67 is desired in order that the cushion block 64 is maintained at a precise position, that is, where the tension of the spring 63 will maintain the arm 59 resting on the block 64 in such a position to barely maintain the marking point of the device 60 off of the tape 38 when the free end of the rocker 59 is disengaged from the cam 58. A tensioned rider 69 is provided for the tape 38 just in advance of the point of the marking device 60.

The marking device 60 consists of a vertically disposed cylinder 70 provided with a circumferential shoulder 71 for abutment with a clamp structure 72 located on the adjacent end of the rocker 59. The clamp structure embodies two bands $x$ and $y$ between which the shoulders are interposed. This cylinder 70 is a reservoir for containing a marking fluid 72 and has a vented cap 73. This reservoir may be of brass or glass. A plug 74 preferably of brass or glass is provided and inserted in the lower end of the cylinder reservoir 70 and this has a bore 75 therethrough for receiving a tube 76 in which is located a valve element 77 located on the upper end of a pen or marking element 78. A spring 79 serves to urge the valve 77 downwardly against the seat 80, but when the point or pen 78 strikes the tape 38 (see Figure 5) the valve 77 is lifted and some of the fluid runs out on the tape, thus marking the tape.

In the operation of the device, it can now be seen, that the legs 7, 9 are swung downwardly in order to remove the filled roll 20 and insert a roll 19 of unmeasured and marked tape. The end of the tape is now run over the guide roller 30 and over the rolls 39, 40 and under the tensioning elements 41, 69, the marking and measuring device 44 having been swung to the broken line position shown in Figure 7. The tape is now run over the guide roller 37 and down to the roll 20. The device 44 is now swung over onto the tape, the tape being depressed down between the rolls 39, 39 as shown in Figure 5 and the device 44 latched by the detent 49.

The motor 23 is now started and serves to rotate the take-on roll 20, pulling the tape 38 through the mechanism of the measuring and marking device 44. As this takes place, the tape rotates the roll 40 and through the gears 50, 52 and 54 the disk 57 is operated, carrying the cam 58 against the adjacent end of the rocker 59. When the cam 58 leaves the end of the rocker 59, the spring 63 suddenly jerks the marker end of the rocker 59 downwardly, with the result that the point 78 makes a mark on the tape 38, this marking operation is only momentary, because the cushioning block 64 made of sponge rubber will sustain the rocker 59 against anything but a momentary touch of the tape 38.

Figure 16:
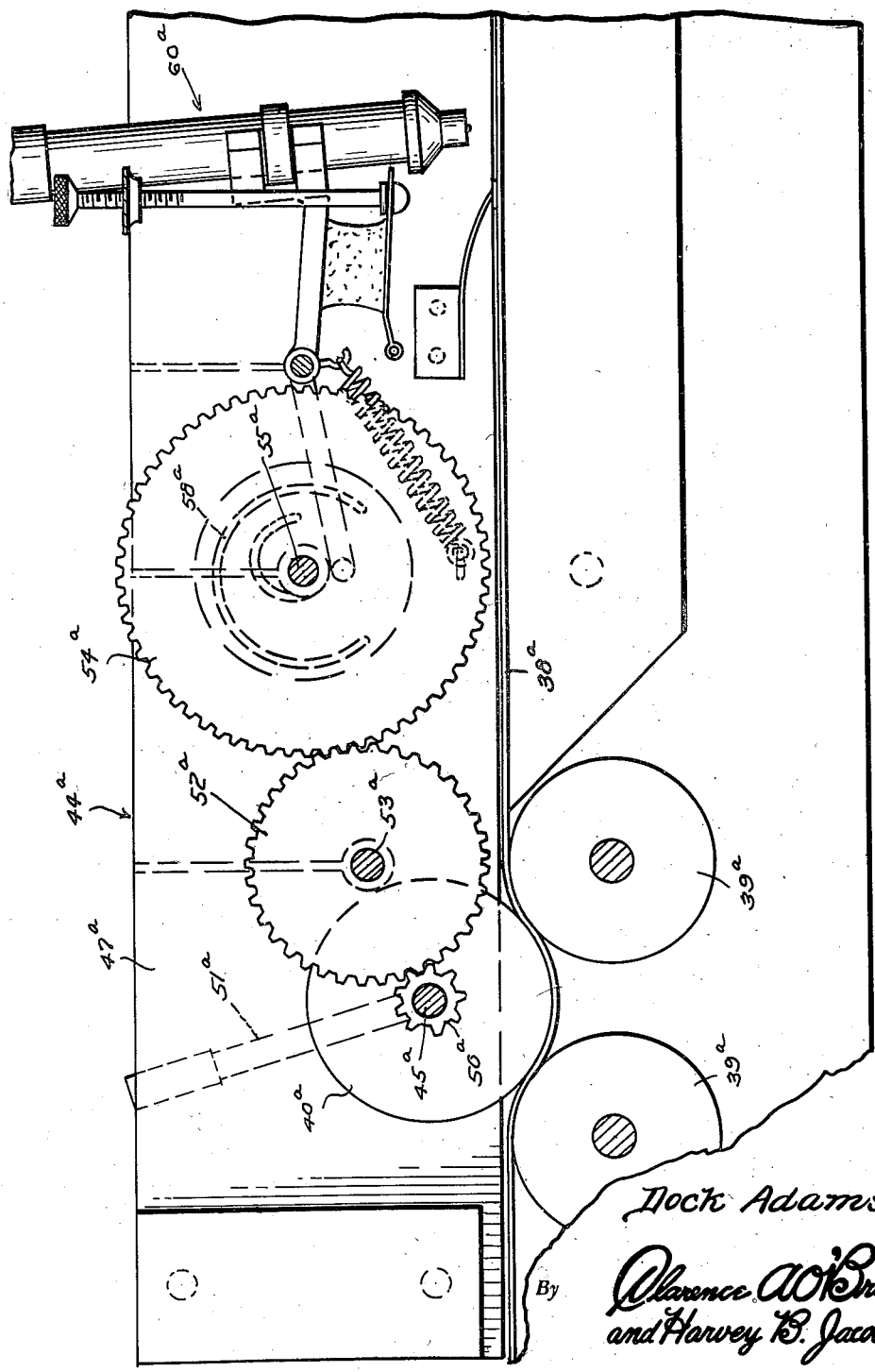
Figure 16 is a longitudinal sectional view of the modified form of stamping and measuring device taken substantially on the line 16—16 of Figure 13.

A modification of the stamping and measuring device is shown in Figures 13 and 16 and a modified form of marker is shown in Figures 14 and 15.

The modified stamping and measuring device is generally referred to by reference character 44a, the same having side walls 47a, 47a which are bridged by shafts 45a, 53a and 55a, which correspond to the shafts 45, 53 and 55 in the form of the invention shown in Figure 5. The shaft 45a carries a feed roll 40a which cooperates with a pair of underlying idler rolls 39a, 39a in feeding tape 38a. The shaft 45a has adjusting means 51a which corresponds to the adjusting means 51 shown in Figure 5.

On the shaft 53 is an idler gear 52a corresponding to the gear 52, this meshing with a pinion 50a on the shaft 45a which is employed instead of the gear wheel 50 in Figure 5. The idler gear 52a also meshes with a large gear 54a which is employed in place of the pinion 54 located on the shaft 55 in Figure 5. A cam 58a corresponding to the cam 58 in Figure 5 may be located directly on one side of the gear 54a. It can thus be seen, that the arrangement of gears in the modified form of the invention is substantially reverse from that shown in the form shown in Figure 5.

Figures 14, 15 and 16 show a modified form of marker and this is generally referred to by reference character 60a. This marker 60a is supported substantially in the same manner as the marker 60 and is actuated by the cam trip mechanism shown in Figure 5.

The modified form of marker consists in the provision of a cylinder 78 in which a suitable marking fluid 72a is placed and in the bottom of which is located a plug 74a of brass or glass.

A barrel 75a extends vertically in the plug 74a and has a slide valve 77a therein normally urged downwardly by a spring 79a, this element 77a having a valve structure 80a cooperative with a seat in the lower portion of the barrel 75a.

The lower portion of the barrel 75a has a socket therein receiving a portion of a cushion block 100 having a central opening through which depends a pin 78a projecting from the element 77a at a short distance below the block 100, this pin 78a functioning the same as the element 78 of the marker shown in Figure 10.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a tape measuring and marking machine, a base frame, a pay-off roll, and a take-on roll mounted on said frame in spaced-apart relation to provide a horizontal traveling run of tape therebetween, a marking device adapted to overlie said run, means to operate said device by travel of said run including a pressure roll adapted for overlying engagement with said run, and gearing driven by said roll, and means to mount said device, roll and gearing above said run for swinging movement into and from overlying relation to said run.

2. In a tape measuring and marking machine, a base frame, a pay-off roll, and a take-on roll mounted on said frame in spaced-apart relation to provide a horizontal traveling run of tape therebetween, a marking device adapted to overlie said run, means to operate said device by travel of said run including a pressure roll adapted for overlying engagement with said run, gearing driven by said roll, means to mount said device, roll and gearing above said run for swinging movement into and from overlying relation to said run, and a pair of horizontally spaced rollers on said base frame for supporting said run and between which and said pressure roll the run is frictionally gripped when the pressure roll is swung into such overlying relation.

3. In a tape measuring and marking machine, a base frame, a pay-off roll, and a take-on roll mounted on said frame in spaced-apart relation to provide a horizontal traveling run of tape therebetween, a marking device adapted to overlie said run, means to operate said device by travel of said run including a pressure roll adapted for overlying engagement with said run, gearing driven by said roll, and means to mount said device, roll and gearing above said run for swinging movement into and from overlying relation to said run, said means comprising a hinged frame.

DOCK ADAMS.